(12) United States Patent
Noritake (10) Patent No.: US 7,155,992 B2
(45) Date of Patent: Jan. 2, 2007

(54) DRIVING FORCE TRANSMISSION MECHANISM AND DAMPER APPARATUS EQUIPPED WITH DRIVING FORCE TRANSMISSION MECHANISM

(75) Inventor: Seiichiro Noritake, Nagano (JP)

(73) Assignee: Nidec Sankyo Corporation, Nagano (JP)

(*) Notice: Subject to any disclaimer, the term of this patent is extended or adjusted under 35 U.S.C. 154(b) by 257 days.

(21) Appl. No.: 10/367,662

(22) Filed: Feb. 14, 2003

(65) Prior Publication Data

US 2003/0159736 A1  Aug. 28, 2003

(30) Foreign Application Priority Data

Feb. 18, 2002 (JP) ............................. 2002-040103

(51) Int. Cl.
*F25D 17/08* (2006.01)

(52) U.S. Cl. .................... 74/84 R; 74/411.5; 74/414; 74/435; 74/531

(58) Field of Classification Search ............... 74/84 R, 74/112, 411.5, 432, 435, 436, 437, 530, 531; 251/129.11, 129.12, 250.5; 62/187; 16/335, 16/341, 337
See application file for complete search history.

(56) References Cited

U.S. PATENT DOCUMENTS

| | | | | |
|---|---|---|---|---|
| 2,651,205 A | * | 9/1953 | Clurman | 74/5.1 |
| 3,059,360 A | * | 10/1962 | Krauskopf | 353/116 |
| 4,683,768 A | * | 8/1987 | Budinski | 74/411.5 |
| 5,918,348 A | * | 7/1999 | Carpenter et al. | 16/342 |
| 6,069,466 A | * | 5/2000 | Noritake et al. | 318/685 |

* cited by examiner

*Primary Examiner*—William C. Joyce
(74) *Attorney, Agent, or Firm*—Hogan & Hartson LLP (57) ABSTRACT

A driving force transmission mechanism having a following rotation preventing mechanism that prevents a follower wheel from rotating together with a driving wheel in a play section is provided. Also, a damper apparatus that can drive two open-close plates independently from each other through the driving force transmission mechanism are provided. The following rotation preventing mechanism includes a cam member that rotates together with the follower wheel, and an elastic member that elastically presses a cam surface of the cam member. The cam surface has an arcuate section that slides against the elastic member in a linked movement section in which the follower wheel follows rotations of the driving wheel, small diameter sections on both sides of the arcuate section, and ridge sections that continuously connects the small diameter sections and the arcuate section without forming step differences. The following rotation of the follower wheel is prevented by a load that is generated as an abutting position between the elastic member and the cam surface shifts from the smaller diameter section past the ridge section into the arcuate section.

6 Claims, 9 Drawing Sheets

Rotational position of Cam member 8
and Second Driving Gear 26

DRIVING FORCE TRANSMISSION MECHANISM AND DAMPER APPARATUS EQUIPPED WITH DRIVING FORCE TRANSMISSION MECHANISM

BACKGROUND OF THE INVENTION

1. Field of the Invention

The present invention relates to a driving force transmission mechanism that can prevent a follower wheel from rotating together with a driving wheel in a play section, and a damper apparatus that can drive two open-close plates independently from each other through the driving force transmission mechanism.

2. Related Background Art

A variety of driving force transmission mechanisms that transmit driving force from a driving wheel (or gear) to a follower wheel (or gear) are known. One of such driving force transmission mechanisms engages a driving wheel with a follower wheel to make the follower wheel to follow rotations of the driving wheel in a linked movement section, and releases the engagement between the driving wheel and the follower wheel to rotate only the driving wheel in a play section. This driving force transmission mechanism may be assembled in a damper apparatus of a refrigerator, for example, to drive two open-close plates independently from each other with one driving source, to supply cold gas from an evaporator to different chambers within the refrigerator.

Figure 8:
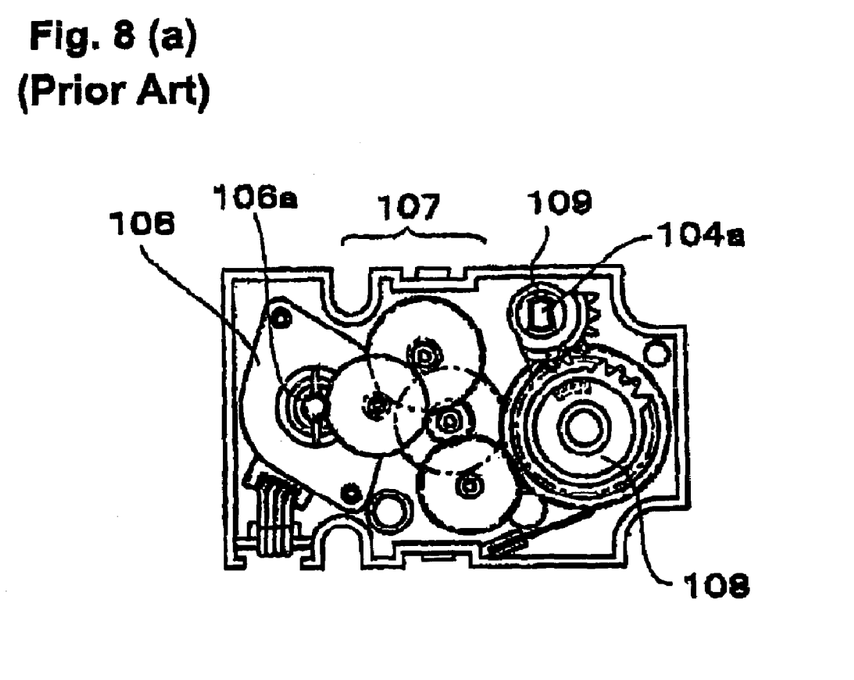
FIG. 8(a) is a plan view of an inner structure of a driving section of a conventional damper apparatus.
FIG. 8(b) is an explanatory view illustrating a mechanism that prevents following rotations of a second driving gear.

FIGS. 8(a) and 8(b) shows a conventional driving force transmission mechanism. As shown in FIG. 8(a), the driving force transmission mechanism includes a single driving motor 106 that is capable of normal and reverse rotations, a reduction gear train 107 composed of four gears for reducing the rotation of a pinion 106a that is mounted on a rotary shaft of the driving motor 106, a first driving gear 108 to which the rotation of the driving motor 106 that is reduced by the reduction gear train 107 is transmitted, and a first follower gear 109 that engages the first driving gear 108 only in a specific section. The first follower gear 109 is linked to a rotary shaft 104a of a first open-close plate among two open-close plates. Therefore, when the first driving gear 108 engages the first follower gear 109 and rotates in a normal direction or a reverse direction, the first open/close plate opens or closes.

Further, as shown in FIG. 8(b), a second driving gear 110 is disposed concentrically with the first driving gear 108 at a position where the second driving gear 110 overlaps the first driving gear 108, and the second driving gear 110 engages a second follower gear 111. The second follower gear 111 is linked to a rotary shaft 105a of a second open/close plate among the two open/close plates. Therefore, when the second driving gear 110 engages the second follower gear 111 and rotates in a normal direction or a reverse direction, the second open/close plate opens or closes.

Because the two open-close plates are independently driven by the single driving motor 106 as a common driving source, the damper apparatus operates in a manner that, in a linked movement section among a rotation section of the first driving gear 108, the first driving gear 108 and the second driving gear 110 are engaged with each other such that the second driving gear 110 follows the rotation of the first driving gear 108; and in a play section, the engagement between the first driving gear 108 and the second driving gear 110 is released so that only the first driving gear 108 rotates.

However, with this mechanism, when the first driving gear 108 rotates in the play section, its driving force is transmitted to the second driving gear 110 through grease or the like that is present between the first driving gear 108 and the second driving gear 110, and in some cases, the second driving gear 110 rotates together with the first driving gear 108.

In the damper apparatus shown in FIG. 8(b), groove sections 110c and 110d are formed along an outer circumferential portion of the second driving gear 110, and a leaf spring 112 with an engagement section 112a is provided. The engagement section 112a enters the groove section 110c or 110d during the play section to stop the rotation of the second driving gear 110, which prevents the second driving gear 110 from rotating together with the first driving gear 108.

However, the click-type following rotation preventing mechanism such as the one described above in which the engaging section 112a of the leaf spring 112 enters the grooves 110c and 110d has a problem in that a substantially large force is required for the engagement section 112a of the leaf spring 112 to ride over the stops formed by the groove sections 110c and 110d.

Figure 9:
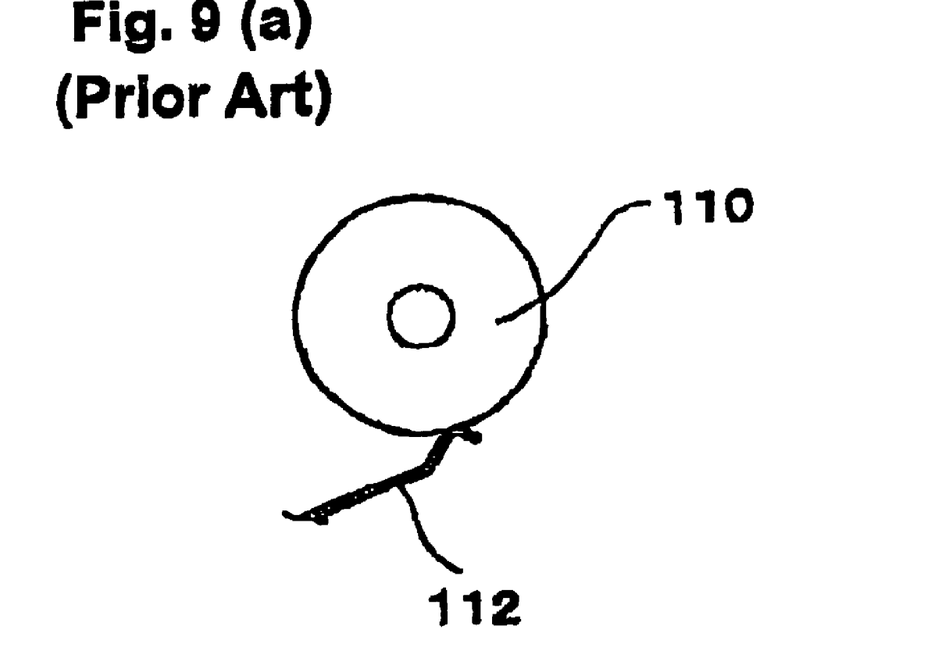
FIGS. 9(a) and 9(b) are explanatory views illustrating a mechanism that prevents following rotations of a second driving gear in other conventional damper apparatuses.

FIGS. 9(a) and 9(b) show other following rotation preventing mechanisms in which a leaf spring 112 is provided to abut against an arcuate portion of the second driving gear 110. In these following rotation preventing mechanisms, only frictional force between the leaf spring 112 and the second driving gear 110 is used to prevent the rotation of the second driving gear 110. Under normal conditions, these following rotation preventing mechanisms may not have any particular problem. However, for example, when the grease deteriorates and its viscosity increases, following rotations of the second driving gear 110 cannot be securely prevented. On the other hand, if a large pressure force is set to the leaf spring 112 to securely prevent following rotations of the second driving gear 110 in the mechanism shown in FIG. 9(a) or FIG. 9(b), a substantially large force is required during the linked movement section where the second driving gear 110 is also driven to rotate, and abrasion occurs rapidly on the leaf spring 112 or the outer circumferential surface of the second driving gear 110.

SUMMARY OF THE INVENTION

In view of the problems discussed above, the present invention relates to a driving force transmission mechanism that generates an appropriate checking force to prevent following rotations of a follower wheel, and that does not cause problems such as an increased torque and abrasion during a linked movement section in which the follower wheel is also driven to rotate, and a damper apparatus equipped with the driving force transmission mechanism.

In accordance with an embodiment of the present invention, a driving force transmission mechanism includes a driving wheel, a follower wheel that is driven by the driving wheel, a link mechanism that engages the driving wheel and the follower wheel to make the follower wheel to follow the rotation of the driving wheel in a linked movement section among a rotation section of the driving wheel, and releases the engagement between the driving wheel and the follower wheel in a play section to rotate only the driving wheel, and a following rotation preventing mechanism that prevents rotations of the follower wheel in the play section to prevent the follower wheel from rotating together with the driving wheel. The following rotation preventing mechanism may include a cam member that rotates together with the follower wheel, and an elastic member that elastically presses a cam surface of the cam member, wherein the cam surface has an arcuate section of a large diameter that slides against the elastic member in the linked movement section, a small diameter section adjacent to the arcuate section, and a ridge section that continuously connects the small diameter section and the arcuate section without forming a step difference. In one aspect, the following rotation of the follower wheel in the play section is prevented by a load that is generated when an abutting position between the elastic member and the cam surface shifts from the smaller diameter section past the ridge section into the arcuate section.

In the present embodiment, the mechanism that prevents following rotations of a follower wheel has a structure in which an elastic member presses against a cam surface that is formed with a small diameter section, an arcuate section and a ridge section that continuously connects the small diameter section and the arcuate section. This mechanism uses a load that is generated when an abutting position between the elastic member and the cam surface of the cam member moves from the smaller diameter section past the ridge section into the arcuate section. Therefore, in accordance with the present embodiment, the elastic member does not ride over a step difference, a large force is not required when the elastic member moves from the play section to the linked movement section, and abrasion of the members and generation of noises can be prevented. Also, in the present embodiment, following rotations of the follower wheel are prevented by a composite force of a frictional force between the elastic member and the cam surface of the cam member and a momentary force generated when the ridge section pushes back the elastic member. Accordingly, following rotations of the follower wheel can be securely prevented even when the pressure force of the elastic member is not so large, and therefore abrasion of the members can be substantially prevented. Furthermore, in the present embodiment, a large force may be applied to the cam member in rotation from the play section to the linked movement section, but a force applied to the cam member is small when the rotation has completely shifted to the linked movement section. Therefore, both of the driving wheel and the follower wheel can be rotationally driven in the linked movement section with a small driving force.

In accordance with an embodiment of the present invention, the elastic member may preferably be a leaf spring with its both ends affixed to a support, and a generally central portion of the leaf spring is in contact with the cam surface.

In accordance with an embodiment of the present invention, the link mechanism may preferably have the play section in each of rotations of the driving wheel in two opposing directions, and the cam surface may preferably have the ridge section and the small diameter section on each of two end sides of the arcuate section.

The driving force transmission mechanism in accordance with the present embodiment may be used for a damper apparatus having first and second open-close plates that are disposed inside a duct and are driven independently from each other. The damper apparatus may include a motor that is rotatable in normal and reverse directions for driving the first and second open-close plates in opening and closing directions, a first driving gear as the driving wheel to which rotation of the motor is transmitted, a first follower gear that follows the first driving gear in a predetermined section to drive the first open-close plate, a second driving gear as the follower wheel that follows the first driving gear in the linked movement section, and a second follower gear that follows the second driving gear in a predetermined section to drive the second open-close plate.

Other features and advantages of the invention will be apparent from the following detailed description, taken in conjunction with the accompanying drawings that illustrate, by way of example, various features of embodiments of the invention.

PREFERRED EMBODIMENTS OF THE PRESENT INVENTION

A driving force transmission mechanism and a damper apparatus equipped with the driving force transmission mechanism will be described below with reference to the accompanying drawings. The embodiment shows an example in which the damper apparatus is used in a refrigerator.

(Overall Structure)

FIGS. 1(a), 1(b) and 1(c) are a front view, a partially cross-sectional right-side side view, and a partially cross-sectional bottom view of a damper apparatus, respectively, in accordance with an embodiment of the present invention.

As shown in FIGS. 1(a), 1(b) and 1(c), the damper apparatus 1 is equipped with a driving section 2, two (first and second) resin frames 3 and 4 disposed on both sides of the driving section 2, two opening sections 31 and 41 formed in the first and second frames 3 and 4, respectively, and two (first and second) resin open-close plates 5 and 6 for opening and closing the opening sections 31 and 41, respectively. Rotation shafts 51 and 61 of the respective first and second open-close plates 5 and 6 are rotatably supported at one ends thereof by the frames 3 and 4, respectively, and the other ends of the rotation shafts 51 and 61 are inserted into the driving section 2. Also, sheets of foamed polyurethane 52 and 62 are attached to surfaces of the first and second open-close plates 5 and 6 on the side of the openings sections 31 and 41, respectively.

The damper apparatus 1 is used in a refrigerator. The refrigerator is typically divided into a freezer chamber, a refrigerating chamber, a vegetable chamber and the like. Cooled gas (e.g., air) obtained by an evaporator is controllably supplied to these chambers (for example, the refrigerating chamber and the vegetable chamber) by the damper apparatus 1 to control the temperature in each of the chambers. For adjusting the temperature of each of the chambers, the damper apparatus of the present embodiment has four modes of opening and closing states of the first and second open-close plates 5 and 6 to control the cooled gas that flows into the vegetable chamber and refrigerating chamber, i.e., a mode in which both of them are in closed positions (close-close position), a mode in which both of them are in opened positions (open-open position), a mode in which one of them is in the opened position and the other in the closed position (open-close position), and a mode in which one of them is in the closed position and the other in the opened position (close-open position).

(Opening and Closing Mechanism of the Open-Close Plates)

Figure 1:
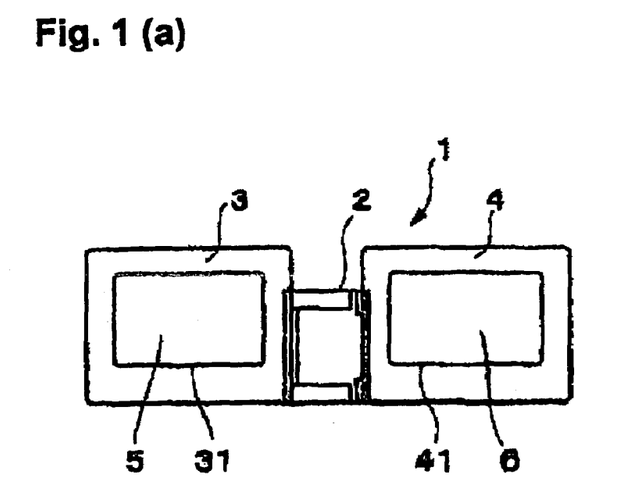
FIGS. 1(a), 1(b) and 1(c) are a front view, a partially cross-sectional right-side side view, and a partially cross-sectional bottom view of a damper apparatus, respectively, in accordance with an embodiment of the present invention.
Figure 2:
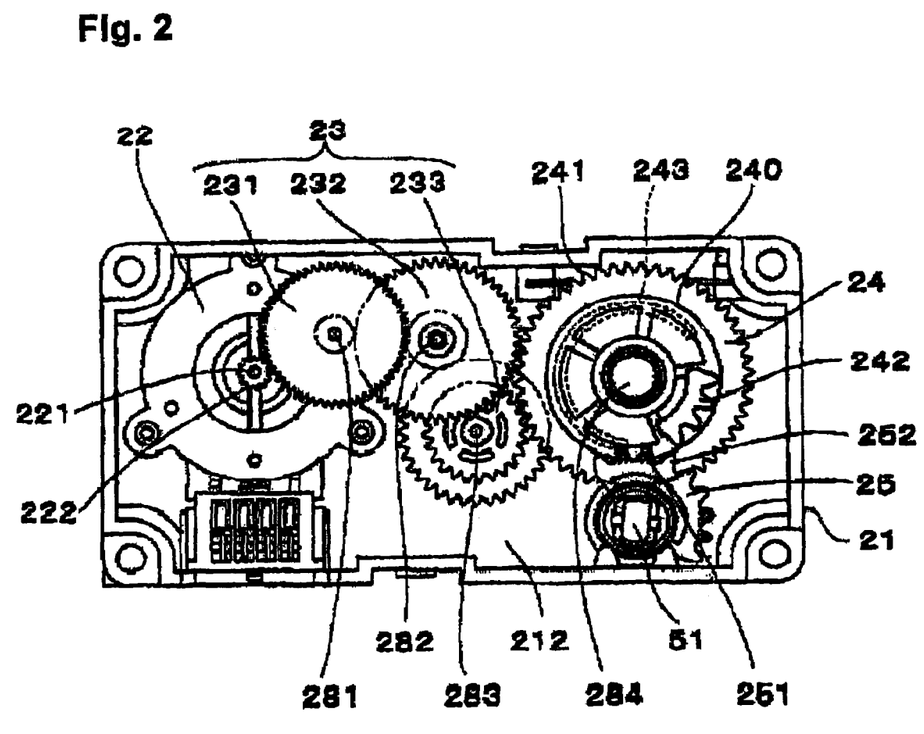
FIG. 2 is a plan view of an inner structure of a driving section of the damper apparatus shown in FIG. 1.
Figure 3:
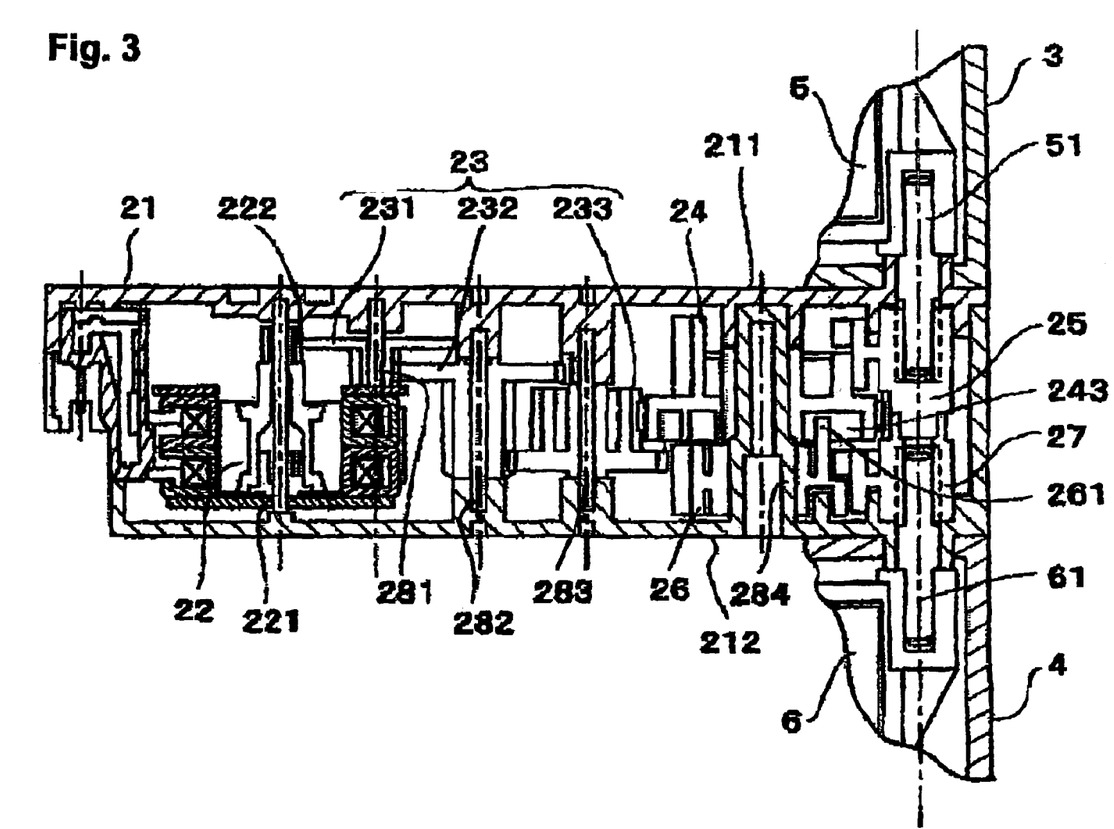
FIG. 3 is a developed longitudinal cross-sectional view of the driving section shown in FIG. 2.
Figure 4:
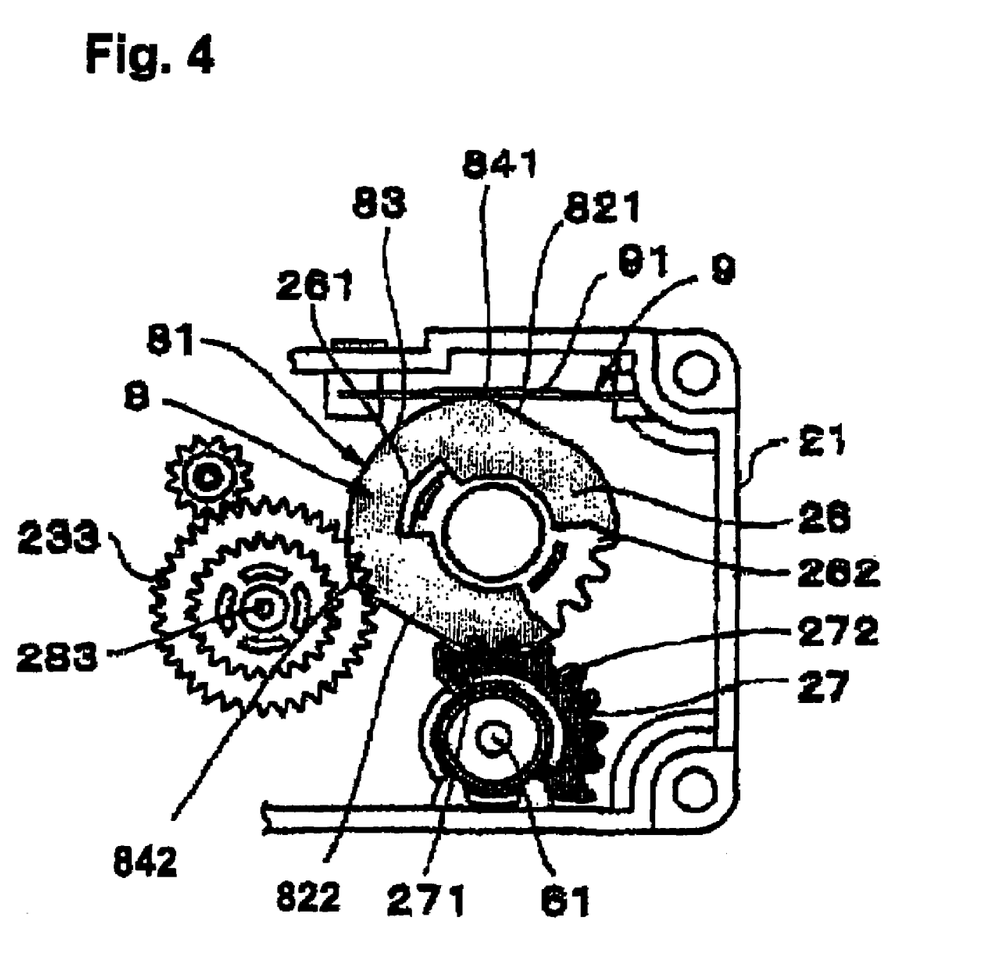
FIG. 4 is an explanatory view illustrating a second driving gear and a second follower gear in the driving section shown in FIG. 2.

FIG. 2 is a plan view of an inner structure of the driving section 2 of the damper apparatus shown in FIG. 1. FIG. 3 is a developed longitudinal cross-sectional view of the driving section 2 shown in FIG. 2. FIG. 4 is an explanatory view illustrating a second driving gear and a second follower gear in the driving section 2 shown in FIG. 2, wherein the second driving gear and the second follower gear are disposed concentrically on the first driving gear and the first follower gear, respectively.

Referring to FIG. 2 and FIG. 3, the driving section 2 includes a resin case 21, a stepping motor 22 as a driving source that is capable of bi-directional rotations fixedly disposed on the inside of the case 21, a reduction gear train 23 that reduces and transmits the rotation of the stepping motor 22, and a driving force transmission mechanism that transmits the rotation or the stepping motor 28 that is reduced by the reduction gear train 23 to the first and second open-close plates 5 and 6 (see FIG. 1). The driving force transmission mechanism includes a first driving gear 24 and a first follower gear 25 that follows the rotation of the first driving gear 24 in at least a specific section.

Also, the driving force transmission mechanism includes a second driving gear 26 that rotates together with the first driving gear 24 in a linked movement section among a rotation section of the first driving gear 24, and does not follow the rotation of the first driving gear 24 in a play section among the rotation section, and a second follower gear 27 that follows the second driving gear 26 in a specific section, as described later with reference to FIG. 4.

As indicated in FIG. 2 and FIG. 3, the case 21 may be in a rectangular solid shape having a side surface 211 on the side of the first frame 3 and a side surface 212 on the side of the second frame 4. A shaft 221 of the stepping motor 22, and a plurality of fixed shaft 281, 282 and 284 extend across the side surfaces 211 and 212.

The fixed shaft 281 is a metal shaft that is affixed to a base plate of the stepping motor 22 and the side surface 211 of the case 21. The fixed shafts 282 and 283 are metal shafts that are affixed to the side surfaces 211 and 212 of the case 21.

The fixed shaft 284 is a resin shaft that is integrally provided on the side surface 212 of the case 21.

A first reduction gear 231, a second reduction gear 232 and a third reduction gear 233 of the reduction gear train 23 are freely rotatably supported on the fixed shafts 218, 282 and 283, respectively.

The first driving gear 24 and the second driving gear 26 are freely rotatably supported on the fixed shaft 284. In other words, the first driving gear 24 and the second driving gear 26 are disposed one on top of the other on the same shaft.

The stepping motor 22 is a common power source that is capable of bi-directional rotations for driving the first and second open-close plates 5 and 6 in opening and closing directions. The rotation of a pinion 222 attached to the rotation shaft 221 of the stepping motor 22 is reduced by the reduction gear train 23 and transmitted to the first driving gear 24.

The first driving gear 24 is equipped with a receiving teeth section 241 having gears formed along its entire outer circumference such that the rotation of the third reduction gear 233 is always transmitted, and a feed teeth 242 that intermittently feeds the first follower gear 25 above the receiving teeth section 241 in a direction of the shaft. The feed teeth 242 engages a teeth section 251 of the first follower gear 25 only in a specific section. Because the first follower gear 25 is linked to the rotation shaft 51 of the first open-close plate 5, the first open-close plate 5 is opened or closed as the first follower gear 25 rotates. The teeth section 251 (hatched section in the figure) of an entire teeth section of the first follower gear 25 has a shape in which about a half of the lower side of the teeth section 251 in the axial direction is cut, and a teeth section 252 (without hatching lines in the figure) of the first follower gear 25 is formed thicker than the teeth section 251. As a result, when the teeth section 251 rides on an intermediate diameter section 240 of the first driving gear 24, the other teeth section 252 abuts against the outer circumferential surface of the intermediate diameter section 240 to thereby prevent unnecessary rotations of the first follower gear 25.

The first driving gear 24 thus composed is disposed on top of the second driving gear 26 along the same axis as described above, and a link mechanism is formed by using the overlapped portions of the first driving gear 24 and the second driving gear 26. The link mechanism engages the first driving gear 24 with the second driving gear 26 in a linked movement section among a rotation section of the first driving gear 24 to thereby have the second driving gear 26 follow the rotation of the first driving gear 24, and releases the engagement between the first driving gear 24 and the second driving gear 26 in a play section among the rotation section to have only the first driving gear 24 rotate.

In the present embodiment, as a part of the link mechanism, an arcuate recessed portion 243 is formed in the surface of the first driving gear 24 on the side facing the second driving gear 26, and an engagement protruded segment 261 is formed on the second driving gear 26 on the side facing the first driving gear 24. The engagement protruded segment 261 is received in the recessed portion 243 of the first driving gear 24. Through the engagement between the engagement recessed portion 243 and the engagement protruded segment 261, the second driving gear 26 rotates with the first driving gear 24 in a unitary fashion in the linked movement section, but in the play section, the second driving gear 26 does not follow the rotation of the first driving gear 24. More specifically, because the engagement recessed portion 243 is relatively longer than the engagement protruded segment 261, in the linked movement section in which the engagement protruded segment 261 has abutted against an inner wall surface 243A located at an end section of the engagement recessed portion 243 in one direction and further moves in this direction, the rotation of the first driving gear 24 is transmitted to the second driving gear 26, but in the play section in which the engagement protruded segment 261 is moving in an intermediate portion of the engagement recessed portion 243 along its lengthwise direction, the rotation of the first driving gear 24 is not transmitted to the second driving gear 26.

The feed teeth 262 is formed in a part of the outer circumference of the second driving gear 26 for feeding the second driving gear 27. When the second driving gear 26 rotates with the first driving gear 24 in a unitary fashion, the feed teeth 262 transfers the rotation to the second follower gear 27. Since the second follower gear 27 is linked to the rotation shaft 61 of the second open-close plate 6, the second open-close plate 6 is closed or opened when the second follower gear 27 rotates. A teeth section 271 (hatched section in the figure) of an entire teeth section of the second follower gear 27 has a shape in which about a half of the lower side of the teeth section 271 in the axial direction is cut, and a teeth section 272 (without hatching lines in the figure) of the second follower gear 27 is formed in a full thickness of the second follower gear 27. As a result, when the teeth section 271 rides on the cam member 8, the other teeth section 272 abuts against the cam member 8 to thereby prevent unnecessary rotations of the second follower gear 26.

(Following Rotation Preventing Mechanism)

Figure 5:
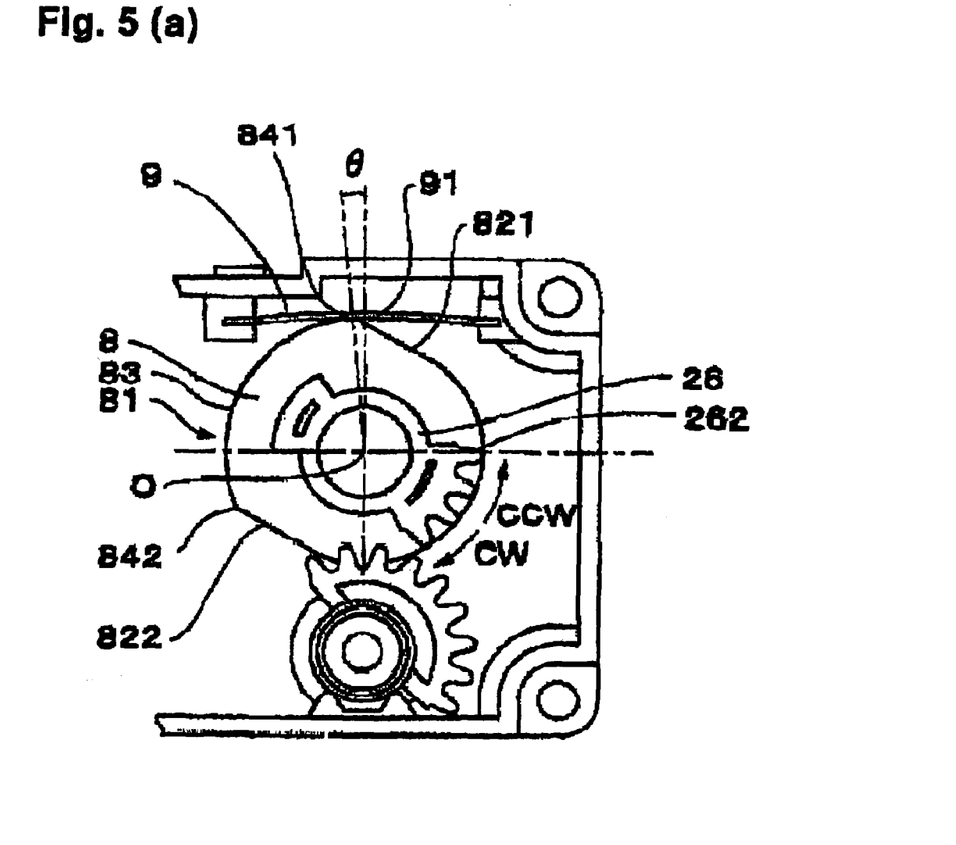
FIG. 5(a) is an explanatory view illustrating a mechanism that prevents following rotations of the second driving gear.
FIG. 5(b) shows a graph of rotational torque of the second driving gear.

FIG. 5(a) is an explanatory view illustrating a mechanism that prevents following rotations of the second driving gear 26.

There is a possibility in the damper apparatus 1 of the present embodiment that, when only the first driving gear 24 is intended to rotate in the play section among the rotation section of the first driving gear 24, its rotational force may be transmitted to the second driving gear 26 through grease or the like that is present between the first driving gear 24 and the second driving gear 26, such that the second driving gear 26 may follow the rotation of the first driving gear 24.

In view of this possibility, in accordance with the present embodiment, a following rotation preventing mechanism is provided for the second driving gear 26. The following rotation preventing mechanism is equipped with the cam member 8 in a disk shape that is formed in one piece with the second driving gear 26, and a leaf spring 9 (force applying member) with its end portions being affixed to the case 21, wherein an intermediate section 91 of the leaf spring 9 abuts against a cam face 81 that is formed on the outer circumferential surface of the cam member 8.

The cam face 81 includes small diameter sections 821 and 822 in a generally linearly out shape and an arcuate section 83 of a larger diameter that slides against the leaf spring 9 in the linked movement section formed adjacent to the small diameter sections 821 and 822. The arcuate section 83 of the large diameter may be defined by a semi-circle having a predetermined radius. Further, ridge sections 841 and 842 are formed between the arcuate section 83 and the small diameter sections 821 and 822, respectively, for continuously connecting the small diameter sections 821 and 822 to the arcuate section 83 without forming step differences.

The cam member 8 thus composed, as shown in FIG. 5(a), abuts against the leaf spring 9 in the play section in a position in which a contact point between the cam member 8 and the leaf spring 9 is shifted at an angle 0 in a counterclockwise (CCW) direction from a perpendicular line drawn between a rotation center O of the cam member 8 and the second driving gear 26 and the leaf spring 9, which prevents the second driving gear 26 from following the rotation of the first driving gear 24.

In the state shown in FIG. 5(a), when the first driving gear 24 rotates in a clockwise CW direction in the play section, a force in the clockwise direction CW is also applied to the cam member 8 and the second driving gear 26 through the grease or the like. A large composite force combining a frictional force that is generated by the ridge section 841 of the cam member 8 upon sliding on the surface of the spring member 9 and a force that is momentarily generated when the ridge section 841 pushes out the spring member 9 is required for the cam member 8 and the second driving gear 26 to rotate in the clockwise direction CW.

FIG. 5(b) shows a graph of torques applied when the second driving gear 26 rotates in the clockwise direction CW. The state indicated in FIG. 5(a) corresponds to a position indicated by an arrow A in FIG. 5(b).

In the following rotation preventing mechanism shown in FIG. 5(a), when the leaf spring 9 abuts against the cam member 8 in a position at the small diameter section 821, only a substantially small amount of torque works on the cam section 8, as indicated by a section F in FIG. 5(b). However, when the cam member 8 further rotates in the clockwise direction CW, and the leaf spring 9 starts abutting against the ridge section of the cam member 8, a composite force combining the frictional force generated as the ridge section 841 slides against the surface of the spring member 9 and the force generated as the ridge section 241 pushes out the spring member 9 momentarily works, as indicated at a position B in FIG. 5(b). Then, as the cam member 8 further rotates in the clockwise direction CW, and the leaf spring 9 has come to abut against the arcuate section 83 of the cam member 8, only the frictional force generated as the arcuate section 83 slides against the spring member 9 works and the torque lowers, as indicated by a section C in FIG. 5(b). As the cam member 8 further rotates in the clockwise direction CW, and when the abutting position between the leaf spring 9 and the cam member 8 passes the arcuate section 83 and as soon as it reaches the small diameter section 822, the torque working on the cam member 8 rapidly lowers, as indicated at a position D in FIG. 5(b). It is noted that the torque rapidly increases at a position E in FIG. 5(b), because the cam member 8 abuts against a stopper not shown in the drawings.

Since the state indicated in FIG. 5(a) corresponds to a position indicate by the arrow A in FIG. 5(b), a large composite force combining the frictional force that is generated as the ridge section 841 of the cam member 8 slides against the surface of the spring member 9 and the force that is momentarily generated as the ridge section 841 pushes out the spring member 9 is required for the cam member 8 and the second driving gear 26 to rotate from this state further in the clockwise direction CW. Therefore, the cam member 8 and the second driving gear 26 can be securely prevented from following the rotation of the first driving gear 24 without providing the leaf spring 9 with a substantially large pressure force.

Also, unlike the click system described above with reference to FIG. 9, since the leaf spring 9 does not ride over any step difference, a large force is not required when the leaf spring 9 moves from the play section to the linked movement section, and therefore abrasion of the members and generation of noises can be prevented.

Furthermore, although a large force may be applied to the cam member 8 when the rotation shifts from the play section to the linked movement section, but the force applied to the cam member 8 is small when the rotation has shifted into the linked movement section, and therefore both of the first driving gear 24 and the second driving gear 26 can be rotated in the linked movement section with a small driving force.

In the present embodiment, there are two play sections in the rotation section of the first driving gear 24 in which the second driving gear 26 does not follow the first driving gear 24, and the following rotation of the second driving gear 26 needs to be prevented in each of the play sections. Accordingly, the cam member 8 is provided with the ridge section 841 that prevents following rotations of the second driving gear 26 in the clockwise direction CW and the ridge section 842 that prevents following rotations of the second driving gear 26 in the counterclockwise direction CCW. The basic structure and operations of both of the ridges sections are substantially the same, and therefore descriptions of the structure and operations that prevent the second driving gear 26 from following the rotation of the first driving gear 24 are omitted.

(Operation of Damper Apparatus)

Figure 6:
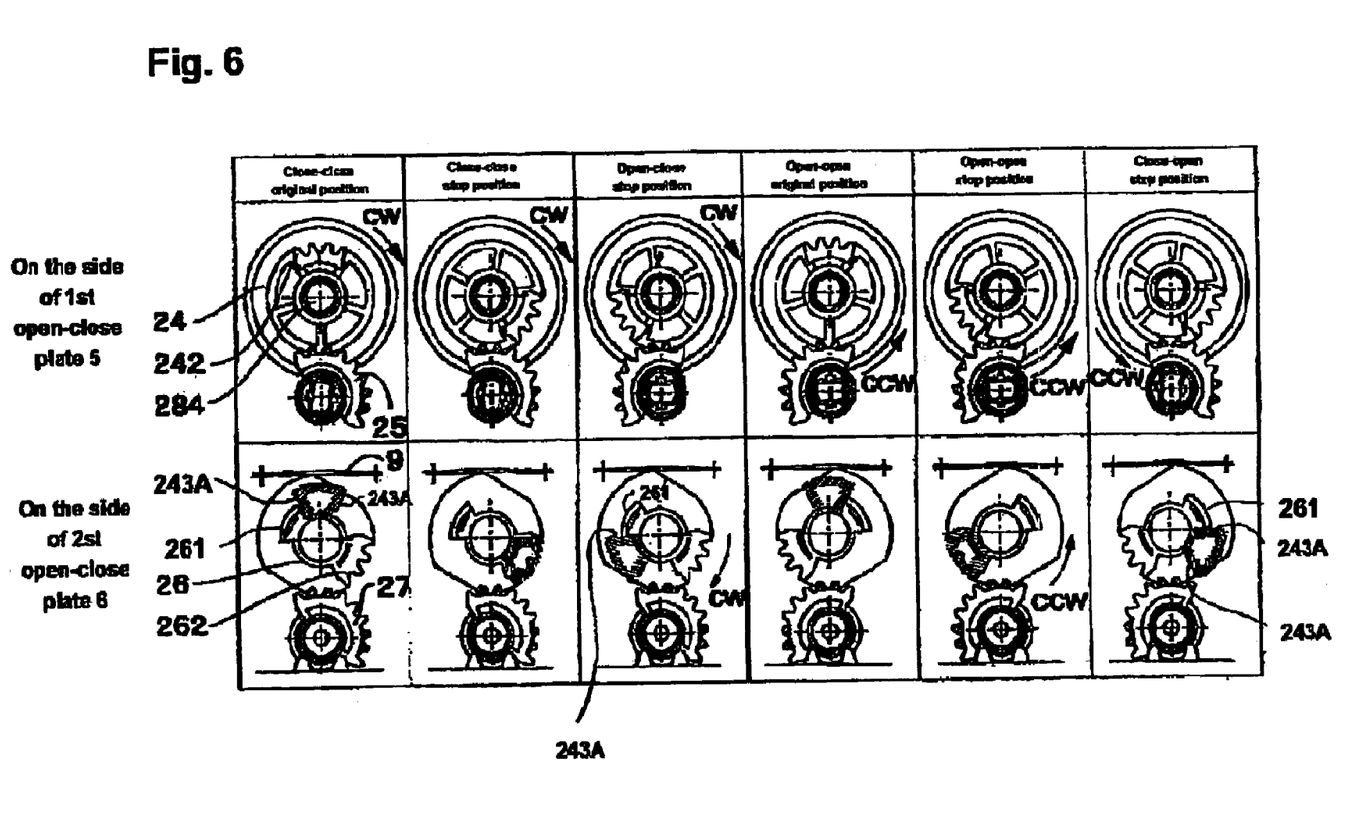
FIG. 6 is an explanatory drawing indicating relations between opening and closes states of first and second open-close plates and rotation positions of the first and second driving gears in the damper apparatus shown in FIG. 1.
Figure 7:
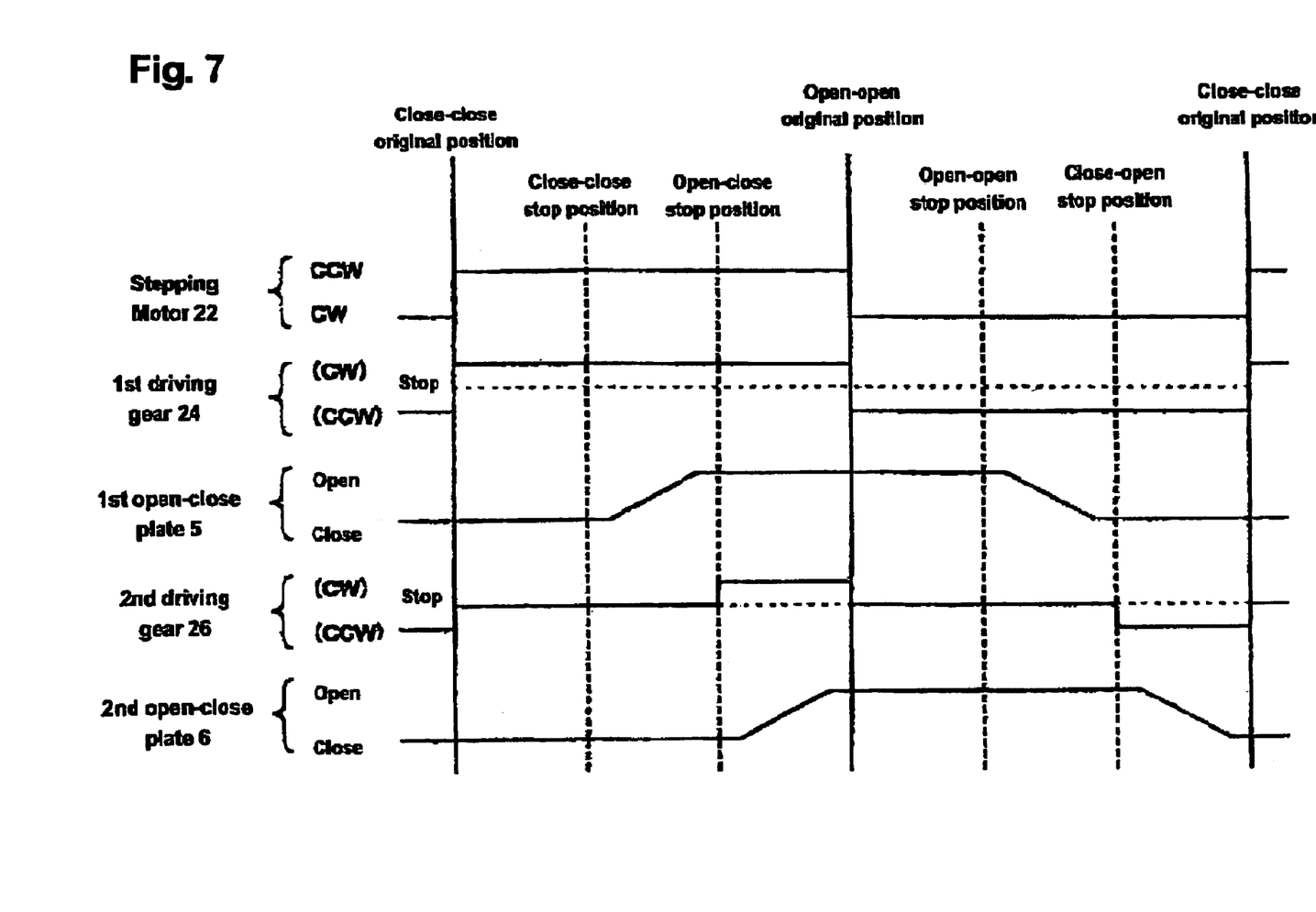
FIG. 7 is an explanatory drawing indicating relations between operations of a stepping motor, the first driving gear and the second driving gear and opening and closing states of the first and second open-close plates in the damper apparatus shown in FIG. 1.

Referring to FIGS. 6 and 7, operations of the damper apparatus 1 in accordance with the present embodiment are be described.

FIG. 6 is an explanatory drawing indicating relations between opening and closes states of first and second open-close plates 5 and 6 and rotation positions of the first and second driving gears 24 and 26 in the damper apparatus 1 shown in FIG. 1. FIG. 7 is an explanatory drawing indicating relations between operations of the stepping motor 22, the first driving gear 24 and the second driving gear 26 and opening and closing states of the first and second open-close plates 5 and 6 in the damper apparatus 1 shown in FIG. 1.

As indicated in FIGS. 6 and 7, in the damper apparatus 1, in an original position (an initial state) in which both of the first and second open-close plates 5 and 6 are in closed states, the feed teeth 242 of the first driving gear 24 is positioned on the opposite side of the first follower gear 25 across the rotation shaft 284. In this initial state, the second driving gear 26 is located at a position where the feed teeth 262 is rotated through 120° clockwise CW from the feed teeth 242 of the first driving gear 24.

To change the state from this close-close original position (initial state) to a close-close stop position, the stepping motor 22 is rotated to rotate the first driving gear 24 through 120° clockwise CW. At this moment, the first driving gear 24 is in the play section where it does not engage the second driving gear 26, and thus the driving gear 26 does not rotate. In this state, both of the first and second open-close plates 6 are in closed states, which defines the close-close stop position.

To change the state from this close-close stop position to an open-close stop position in which only the first open-close plate 5 is opened, the stepping motor 22 is rotated to further rotate the first driving gear 24 through 120° clockwise CW. The feed teeth 242 of the first driving gear 24 engages the first follower gear 25, and rotates the first follower gear 25 to thereby open the first open-close plate 5. During this position, the fires driving gear 24 is in the play section where it does not engage the second driving gear 26, and therefore the second driving gear 26 does not rotate. Accordingly, the first open-close plate 5 is in the open state, but the second open-close plate 6 remains to be in the closed state, which defines the open-close stop position.

In this play section, the positions of the cam member 8, the second driving gear 26 and the leaf spring 9 are in a state indicated in FIG. 5(a). In this state, even when the first driving gear 24 rotates, a force, which is greater than a composite force of the frictional force generated as the ridge section 841 slides against the surface of the spring member 9 and the force generated as the ridge section 841 pushes out the spring member 9, is not applied to the cam member 8 and the second driving gear 26, such that the cam member 8 and the second driving gear 26 do not follow the rotation of the first driving gear 24.

Next, when the stepping motor 22 is further rotated from this open-close stop position, to rotate the first driving gear 24 through 120° in clockwise CW, both of the first and second open-close plates 5 and 6 are completely opened in a open-open original position. As the first driving gear 24 is rotated clockwise CW from the open-close stop position, the inner wall surface 243A located at an end section of the engaging recessed section 243 of the first driving gear 24 abuts against the engagement protruded segment 261 of the second driving gear 26, the first driving gear 24 engages the second driving gear 26 in the linked movement section, in which the first driving gear 24 and the second driving gear 26 rotate together. During this period, the feed teeth 262 of the second driving gear 26 engages the second follower gear 27, such that the second follower gear 27 rotates and the second open-close plate 6 opens. Also, the first open-close plate 5 remains in the opened state. In this manner, when the first driving gear 24 rotates through 360° clockwise from the close-close original position, both of the first and second open-close plates 5 and 6 are completely opened, which defines an open-open original position.

In the linked movement section of the following rotation preventing mechanism indicated in FIG. 5(a), the abutting position between the cam member 8 and the leaf spring 9 shifts on the arcuate section 83 in the clockwise direction CW, and reaches the open-open original position.

Next, as the rotation shaft 221 of the stepping motor 22 is rotated from the open-open original position in a reverse direction, to rotate the first driving gear 24 in the counterclockwise direction CCW through 120°, the open-close plates 5 and 6 assume an open-open stop position. A section between the open-open original position and the open-open stop position defines the play section where the first driving gear 24 does not engage the second driving gear 26, and the second driving gear 26 does not rotate. In this open-open stop position, both of the first and second open-close plates 5 and 6 are in the opened state.

To change the state from the open-open stop position to a close-open stop position, the rotation shaft 221 of the stepping motor 22 is rotated to rotate the first driving gear 24 in the counterclockwise direction CCW through 120°, such that the feed teeth 242 of the first driving gear 24 engages the first follower gear 25, and the first follower gear rotates and the first open-close plate 5 is closed. During this period, the first driving gear 24 does not engage the second driving gear 26 in the play section, and the second driving gear 26 does not rotate. Accordingly, the first open-close plate 5 is moved to the closed state, but the second open-close plate 6 remains to be in the opened state, which defines the close-open stop position.

In this play section, the positions of the cam member 8, the second driving gear 26 and the leaf spring 9 are in a state that is basically the same as the state described above with reference to FIG. 5(a), and therefore their detailed description is omitted. However, in this state, even when the first driving gear 24 rotates, a force, which is greater than a composite force of the frictional force generated as the ridge section 842 slides against the surface of the spring member 9 and the force generated as the ridge section 842 pushes out the spring member 9, is not applied to the cam member 8 and the second driving gear 26, such that the cam member 8 and the second driving gear 26 do not follow the rotation of the first driving gear 24.

When the stepping motor 22 is rotated from this close-open stop position to rotate the first driving gear 24 in the counterclockwise direction CCW through 120°, the inner wall surface 243A located at an end section of the engaging recessed section 243 of the first driving gear 24 abuts against the engagement protruded segment 261 of the second driving gear 26, the first driving gear 24 engages the second driving gear 26 in the linked movement section, in which the first driving gear 24 and the second driving gear 26 rotate together. During this period, the feed teeth 262 of the second driving gear 26 engages the second follower gear 27, such that the second follower gear 27 rotates and the second open-close plate 6 closes. Also, during this period, the first open-close plate 5 remains in the closed state. In this manner, both of the first and second open-close plates 5 and 6 return to the close-close original position in which both of the plates 5 and 6 are completely closed.

In the linked movement section of the following rotation preventing mechanism shown in FIG. 5(a), the abutting position between the cam member 8 and the leaf spring 9 moves on the arcuate section 83 in the clockwise direction CW.

As described above, in accordance with the present invention, the mechanism that prevents following rotations of a follower wheel adopts a structure in which an elastic member presses a cam surface that is equipped with a ridge section that continuously connects small diameter sections and an arcuate section, and uses a load that is generated when an abutting position between the elastic member and the cam surface of the cam member moves from the smaller diameter section past the ridge section into the arcuate section. Therefore, unlike the click type, the elastic member in the present invention does not ride over a step difference, a large force is not required when the elastic member moves from the play section to the linked movement section, and abrasion of the members and generation of noises can be prevented. Also, unlike the conventional following rotation prevention mechanism in which an elastic member presses an arcuate section to prevent following rotation of a follower wheel, following rotations of the follower wheel in the present invention are prevented by a composite force of a frictional force between the elastic member and the cam surface of the cam member and a momentary force generated when the ridge section pushes out the elastic member. Accordingly, following rotations of the follower wheel can be securely prevented even when the pressure force of the elastic member is not so large, and therefore abrasion of the members can be substantially prevented. Furthermore, in the present embodiment, a large force may be applied to the cam member in rotation from the play section to the linked movement section, but a force applied to the cam member is small when the rotation has completely shifted to the linked movement section. Therefore, both of the driving wheel and the follower wheel can be rotationally driven in the linked movement section with a small driving force.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A driving force transmission mechanism comprising:
   a driving wheel;
   a follower wheel that is driven by the driving wheel;
   a link mechanism that engages the driving wheel and the follower wheel to make the follower wheel follow rotations of the driving wheel in a linked movement section of a rotation section of the driving wheel, and releases the driving wheel from the follower wheel in a play section of the rotation section of the driving wheel to rotate only the driving wheel; and
   a following rotation preventing mechanism that prevents rotations of the follower wheel in the play section to prevent the follower wheel from rotating together with the driving wheel,
   wherein the following rotation preventing mechanism comprises:
   a cam member that rotates together with the follower wheel; and
   an elastic member that elastically presses a cam surface of the cam member, wherein the cam surface has an arcuate section of a large diameter that slides against the elastic member when the driving wheel is engaged with the follower wheel in the linked movement section, a small diameter section adjacent to the arcuate section, and a ridge section that continuously connects the small diameter section and the arcuate section without forming a step difference,
   wherein the elastic member is a leaf spring with both ends thereof affixed to a support, and
   wherein a following rotation prevention state of the follower wheel is obtained by the ridge section of the cam surface when the ridge section of the cam surface abuts against the leaf spring under pressure in the play section of the rotation section of the driving wheel.

2. A driving force transmission mechanism according to claim 1, wherein a generally central portion of the leaf spring is in contact with the cam surface.

3. A driving force transmission mechanism according to claim 2, wherein the arcuate section of the large diameter is defined by a partial circle having a predetermined radius.

4. A following rotation preventing mechanism that prevents rotations of a follower wheel in a play section to prevent the follower wheel from rotating together with a driving wheel, the following rotation preventing mechanism comprising:
   a cam member that rotates together with the follower wheel; and
   an elastic member that elastically presses a cam surface of the cam member, wherein the cam surface has an arcuate section that slides against the elastic member in a linked movement section in which the follower wheel follows rotations of the driving wheel, small diameter sections on both sides of the arcuate section, and ridge sections that continuously connect the small diameter sections and the arcuate section without forming step differences,
   wherein the elastic member is a leaf spring with both ends thereof affixed to a support, and wherein a following rotation prevention state of the follower wheel is obtained when one of the ridge sections of the cam surface abuts against the leaf spring.

5. A following rotation preventing mechanism according to claim 4, wherein a generally central portion of the leaf spring is in contact with the cam surface.

6. A following rotation preventing mechanism according to claim 5, wherein the arcuate section of the large diameter is defined by a partial circle having a predetermined radius.

* * * * *